(12) United States Patent
Jones et al.

(10) Patent No.: US 6,783,564 B2
(45) Date of Patent: Aug. 31, 2004

(54) CLUTCH DUST FILTER APPARATUS, AND METHOD OF USING SAME

(75) Inventors: Gordon W. Jones, Toledo, OH (US); Edmond H. Cote, Jr., Edgewater, FL (US)

(73) Assignee: Honeywell International, Inc., Morristown, NJ (US)

( * ) Notice: Subject to any disclaimer, the term of this patent is extended or adjusted under 35 U.S.C. 154(b) by 100 days.

(21) Appl. No.: 10/104,908

(22) Filed: Mar. 22, 2002

(65) Prior Publication Data

US 2003/0177906 A1 Sep. 25, 2003

(51) Int. Cl.[7] .......................... B01D 50/00; B01D 53/34
(52) U.S. Cl. .............. 55/385.3; 55/385.1; 55/DIG. 28; 55/DIG. 30; 60/278; 60/279; 60/297; 60/311; 123/198 E; 422/179; 422/180
(58) Field of Search ............................ 55/385.1, 385.3, 55/DIG. 28, DIG. 30; 123/198 E; 60/278, 279, 297, 311; 422/179, 180

(56) References Cited

U.S. PATENT DOCUMENTS

| | | | |
|---|---|---|---|
| 3,910,770 A | * 10/1975 | Kobylinski et al. | .... 55/DIG. 30 |
| 4,264,344 A | * 4/1981 | Ludecke et al. | ....... 55/DIG. 30 |
| 4,300,924 A | * 11/1981 | Coyle | ..................... 55/DIG. 30 |
| 4,393,652 A | * 7/1983 | Munro | .................. 55/DIG. 30 |
| 4,928,348 A | 5/1990 | Clayton | |
| 5,013,340 A | * 5/1991 | Taslim et al. | .......... 55/DIG. 30 |
| 5,043,147 A | * 8/1991 | Knight | .................. 55/DIG. 30 |
| 5,102,431 A | * 4/1992 | Barry | ..................... 55/DIG. 30 |
| 5,376,341 A | * 12/1994 | Gulati | .................... 55/DIG. 30 |
| 5,557,923 A | * 9/1996 | Bolt et al. | ............. 55/DIG. 30 |
| 6,012,285 A | * 1/2000 | Lutz et al. | ............. 55/DIG. 30 |
| 6,062,365 A | 5/2000 | Gochenour | |
| 6,098,773 A | 8/2000 | Blessinger et al. | |
| 6,576,045 B2 | * 6/2003 | Liu et al. | ............... 55/DIG. 30 |
| 6,598,388 B2 | * 7/2003 | Lucas et al. | ........... 55/DIG. 30 |

* cited by examiner

Primary Examiner—Minh-Chau T. Pham

(57) ABSTRACT

A clutch dust filtration apparatus, for filtering solid particles out of a mixture of air and suspended solids, includes a conduit member, a collection vessel, and a filter member. The conduit member includes a hollow transfer tube and a transverse collar extending outwardly from the transfer tube. The collection vessel has an open end and a closed end, and is indirectly connected to the conduit member. The outlet of the conduit member is spaced away from the closed end of the collection vessel. The filter member is attached to the collection vessel. Incoming air from the conduit member is required to make a sharp turn, in order to exit the apparatus via the filter member. This sharp turn causes solid material to drop out of the mixture and to be collected in the collection vessel.

17 Claims, 3 Drawing Sheets

CLUTCH DUST FILTER APPARATUS, AND METHOD OF USING SAME

BACKGROUND OF THE INVENTION

1. Field of the Invention

The present invention relates to dust traps and filters. More particularly, the present invention relates to a filter apparatus for use in trapping and filtering particles of discarded friction material, out of a mixture of suspended solids and air.

2. Description of the Background Art

High-performance clutches are commonly used in racing cars, such as drag racers. Unfortunately, these clutches wear down very quickly during a race, and in the process, used friction material from the clutch disc is thrown freely from the vehicle, primarily in the form of clutch dust.

Clutch dust is composed of fine metallic and non-metallic particles, which are generated as clutch friction material rapidly wears away from the clutch during a race. These particles are normally ejected from the clutch housing into the air, and many of the particles eventually settle onto the track surface. The air around a race track and the track surface are both undesirable places to deposit this material.

Such discarded friction material may present a hazard to race participants, if it accumulates on a racing track surface. For example, in braking areas, loose accumulated friction material may create a slipping hazard to race vehicles traveling at high speed.

A need therefore exists for a means for reducing or minimizing the uncontrolled release of clutch dust from race cars.

Many different types of air filters are known and are commercially available. It is standard procedure for all internal combustion engines to include an air filter at the intake thereof, to remove dust and other impurities from combustion air entering thereinto.

A specialized vacuuming apparatus, for collecting dust from clutches and brakes during repair and servicing operations, is described in U.S. Pat. No. 4,928,348 to Clayton.

It has also been known to provide adjustment means in clutch assemblies, to provide for axial adjustment of a pressure plate as the clutch disc wears during use.

Examples of such axially adjustable clutch assemblies may be found in U.S. Pat. No. 6,062,365 to Gochenour, and in U.S. Pat. No. 6,098,773 to Blessinger et al. The Blessinger '773 patent discloses a clutch pressure plate having an annular shield, for protecting an axial adjustment mechanism from debris radiating outward from a central area of the clutch.

Although the known devices have some utility for their intended purposes, a need still exists in the art for a dust-trapping filter apparatus for installation on a vehicle to trap and collect spent friction material as it is expelled from a vehicle clutch. In particular, there is a need for such a dust-trapping filter apparatus which includes a filter screen.

SUMMARY OF THE INVENTION

The present invention provides a dust-trapping filter apparatus, for installation on a vehicle to collect clutch dust as it is expelled from a vehicle clutch.

A clutch dust filter apparatus, in accordance with the present invention, generally includes a conduit member, a filter member operatively attached to the conduit member, and a collection vessel. The collection vessel is operatively connected to the filter member and covers an outlet end of the conduit member. Optionally, the filter member may include both an inner filter element and an outer screen.

Accordingly, it is an object of the present invention to provide a method and apparatus for catching and collecting spent clutch filter material, as it is released and expelled from a clutch assembly over time.

It is another object of the present invention to provide a clutch dust filter apparatus which may be periodically cleaned and re-used.

It is still another object of the present invention to provide an apparatus for separating suspended solids from a mixture of air and solids.

Other objects, features, and advantages of the present invention will become apparent from a careful review of the following specification.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE PREFERRED EMBODIMENT

Figure 1:
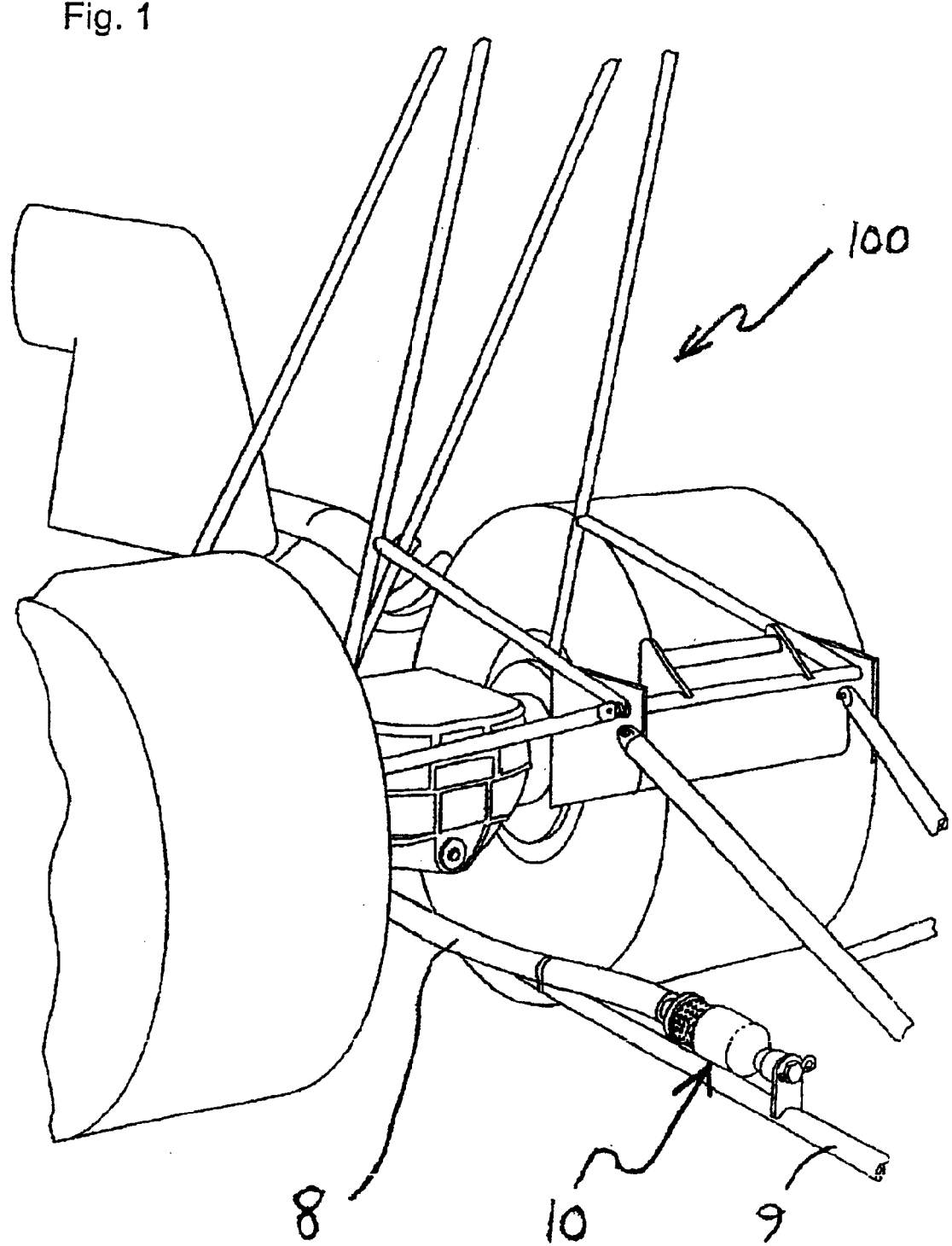
FIG. 1 is a partial perspective view of a back end of a racing car, showing a clutch dust filter apparatus in accordance with the present invention installed thereon.

Referring now to the drawings, a back end of a race car is shown at 100 in FIG. 1. The race car 100 is equipped with a clutch dust transfer hose 8, which is connected at its front end to a vehicle clutch (not shown). The vehicle's bell housing (not shown) is adapted to catch and direct spent friction material into the transfer hose, as it is expelled from the clutch.

A clutch dust filter apparatus 10, according to the present invention, is attached to the back end of the clutch dust transfer hose 8. In the installation shown in FIG. 1, both the clutch dust transfer hose 8 and the clutch dust filter apparatus 10 are attached to a frame member 9 of the vehicle 100.

Figure 2:
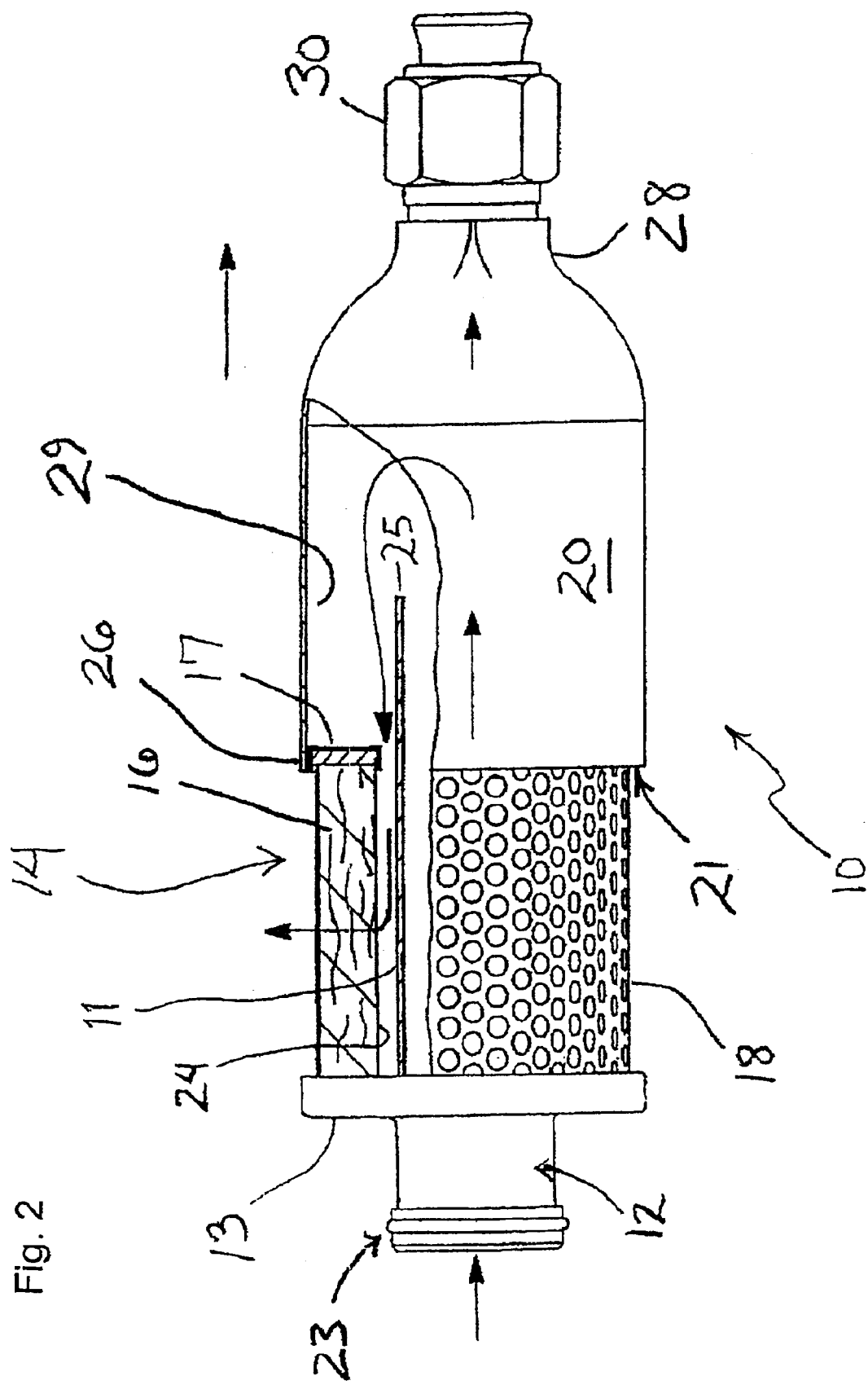
FIG. 2 is a side plan view, partially cut away and in cross-section, of a clutch dust filter apparatus in accordance with a first embodiment of the present invention.

As seen best in FIG. 2, the clutch dust filter 10 includes a conduit member 12, a filter member 14 operatively attached to the conduit member, and a collection vessel 20. Each of these components will be described in further detail herein.

The Conduit Member

The conduit member 12 (FIG. 3) is formed from a strong, solid material such as metal or a strong, heat-resistant plastic. The conduit member 12 has an inlet end 23, which is attachable to the dust transfer hose 8 (FIG. 1). The conduit member 12 also has an outlet end 25, which empties into the collection vessel 20.

Figure 3:
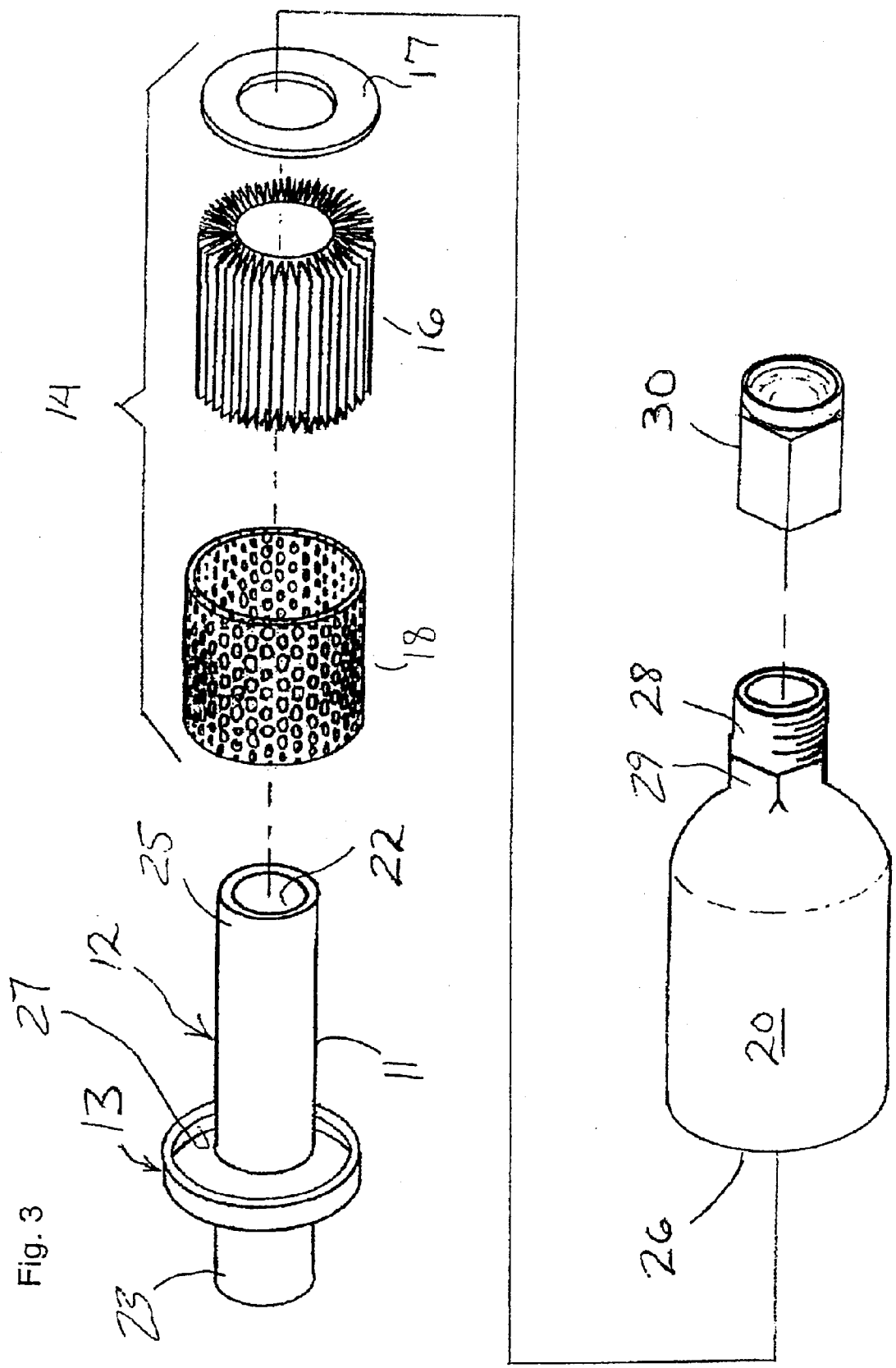
FIG. 3 is an exploded perspective view of the clutch dust filter apparatus of FIG. 2, showing the component parts thereof.

As shown best in FIG. 3, in the depicted embodiment, the conduit member 12 includes a hollow, cylindrical feed tube 11 which defines a hollow inlet passage 22 therethrough. The conduit member 12 also includes a transverse collar 13, which is integrally affixed to the feed tube 11, proximate the inlet end 23 thereof. Optionally, the transverse collar 13 may include an integrally formed annular outer flange 27 extending around the outer periphery thereof.

The Collection Vessel

The collection vessel 20 is a hollow container, defining a storage chamber 29 therein for receiving particles of spent clutch material. The collection vessel 20 is operatively, indirectly attached to the conduit member 12 by the filter member 14, in a manner to be described hereinafter. The outlet end 25 of the conduit member 12 empties out into the storage chamber 29 in the hollow interior of the collection vessel 20.

The collection vessel 20 is substantially bottle-shaped, with a wide end 26 where the bottom of a bottle would normally be, and a narrow end 28 opposite the wide end 26. The wide end 26 of the collection vessel 20 has a large opening 21 (FIG. 2) formed therein, which receives a reinforcing ring 17 at the end of the filter member 14 therein.

During use, the narrow end 28 of the collection vessel 20 is closed off. The narrow end 28 may be made permanently closed. Alternatively, the narrow end 28 of the collection vessel 20 has male threads formed thereon, as shown in FIG. 3, and an internally threaded end cap 30 may be removably provided for temporarily closing the narrow end during normal use. The base of the neck portion at the narrow end 28 of the collection vessel 20, just inside the threaded portion, is preferably made to have a square or hexagonal shape, with a plurality of flattened surfaces therearound, so as to be graspable by a wrench or similar tool when tightening or loosening the end cap 30.

When a user wishes to empty accumulated dust out of the collection vessel, the cap 30 may be removed, using appropriate tools, and the vessel may then be emptied out. Alternatively, where the cap 30 is omitted, and the collection vessel 20 is threadably attached to the filter member 14, the collection vessel may be unscrewed from the filter member and dumped out.

The Filter Member

The filter member 14 includes a foraminous outer screen 18, which fits flush against, and which is glued, welded or otherwise attached to the transverse collar 13 of the conduit member 12. In the depicted embodiment of the apparatus 10, the outer screen 18 fits nestingly and coaxially inside the annular outer flange 27 of the collar 13.

Optionally, the filter member 14 may also include an inner filter element 16 which fits concentrically inside the outer screen 18, and where used, the inner filter element 16 is also glued or appropriately attached to the transverse collar 13. The inner filter element 16 may include a wire mesh screen which is finer than the outer screen 18, and/or may include a porous and pervious filter material, such as pleated filter paper.

Preferably, the filter member 14 also includes a solid reinforcing ring 17 which fits on, and which is attached to an end portion of the outer screen 18, opposite the transverse collar 13. The reinforcing ring is formed from a sturdy material such as a metal or a strong, heat-resistant plastic. Where the inner element 16 is used as part of the filter member 14, the reinforcing ring 17 may also be glued or otherwise attached to the end thereof, as shown.

As best seen in FIG. 2, the reinforcing ring 17 fits inside, and is connected to the wide end of the collection vessel 20, and this connection may be by welding, gluing, interlocking threads, or by other attachment means. Optionally, the outer edge of the reinforcing ring 17 may include a widened portion similar to the outer flange 27 (FIG. 3) of the collar 13.

Another optional feature of the filter member 14 is that the outer edge of the reinforcing ring 17 may have male threads formed therearound, and the opening 21 at the wide end of the collection vessel 20 may be correspondingly internally threaded to receive the reinforcing ring therein.

Function of the Filter Apparatus

It will be noted that, as shown in FIG. 2, the outlet end 25 of the conduit member 12 extends beyond the filter member 14, into the storage chamber 29 of the collection vessel 20. However, the outlet end 25 of the conduit member does not touch the wall at the narrow end of the collection vessel 20, but is spaced away therefrom.

Moreover, as shown in FIG. 2, the radially innermost surface of the inner filter element 16 does not come into contact with the feed tube 11 of the conduit member 12, but is spaced outwardly therefrom, so that a hollow cylindrical opening 24 is formed between the feed tube 11 and the inner surface of the filter element 16. This opening 24 provides a flow passage for air from the collection vessel to travel into, between the feed tube and the inner filter element 16.

A flow path through the filter 10 is generally indicated by the arrows in FIG. 2. Incoming air and clutch dust from the dust transfer hose 8 (FIG. 1) enters the inlet end 23 of the conduit member 12, travels through the conduit member, and then exits from the outlet end 25 and goes into the collection vessel 20. Force exerted by rapid acceleration of the vehicle 100 (FIG. 1) also tends to push the dust component rearwardly in the collection vessel 20.

After the air/solids mixture enters the collection vessel, the air component of the mixture is able to make a sharp turn, roughly 180 degrees, around the end of the feed tube 11, as shown by the arrow in FIG. 2. The air is then able to enter the hollow annular space 24 between the feed tube and the filter element 16. Then, the air passes radially outwardly through the filter element 16, and the outer screen 18, to the surroundings.

However, when the air stream reverses direction at the inner end of the conduit member 12, most of the clutch dust (not shown) is not able to reverse direction, but instead, the dust drops out of the air stream, and is deposited at the narrow end 28 of the collection vessel 20. Further, any fine dust particles that do make it into the space 24 are then filtered out by the inner filter element 16 and/or the outer screen 18.

Although the present invention has been described herein with respect to a preferred embodiment thereof, the foregoing description is intended to be illustrative, and not restrictive. Those skilled in the art will realize that many modifications of the preferred embodiment could be made which would be operable. All such modifications which are within the scope of the claims are intended to be within the scope and spirit of the present invention.

Having, thus, described the invention, what is claimed is:

1. An apparatus for filtering particulate solids out of a mixture of air and solids, said apparatus comprising:

a conduit member having an inlet end and an outlet end;

a porous filter member disposed about an exterior of to the conduit member in a spaced relationship; and a collection vessel disposed about said outlet end and a portion of the filter member, said collection vessel defining an area in fluid communication with said outlet end and an area defined between an inner surface of said porous filter member and said exterior of said conduit member, a portion of an exterior surface of said porous filter member is not covered by said collection vessel wherein said collection vessel is configured to cause air passing into the inlet end of the conduit member change its flow direction in order to exit the apparatus via the filter member and the particulate solids are either deposited in said area or filtered by said pourus filter member.

2. The apparatus of claim 1, wherein the filter member is substantially cylindrical, and is radially spaced away from the conduit member to allow air to pass therebetween.

3. The apparatus of claim 1, wherein said porous filter member comprises an outer screen which substantially surrounds said exterior surface of said porous filter member.

4. The apparatus of claim 1, wherein the collection vessel has a removable end cap to allow the particulate solids deposited therein to be emptied.

5. The apparatus of claim 1, further comprising a reinforcing ring disposed between an end portion of the porous filter member and said area of the collection vessel.

6. The apparatus of claim 4, wherein said removable end cap is positioned on a portion of the collection vessel, having a square or hexagonal shape defined by a plurality of flattened surfaces therearound.

7. The apparatus of claim 1, wherein said exterior surface of said porous filter member is directly exposed to ambient air.

8. The apparatus of claim 1, wherein said exterior surface of said porous filter member is covered by a screen.

9. A clutch dust filtration apparatus for filtering solid particles out of a mixture of air and solids, said apparatus comprising:
- a conduit member having an inlet end and an outlet end and comprising a hollow transfer tube defining a passage therethrough, and a transverse collar attached to said transfer tube;
- a perforated filter member operatively attached to the transverse collar of said conduit member and spaced away from the transfer tube, the filter member comprising a substantially cylindrical filter element having an interior surface and an exterior surface; and
- a collection vessel operatively connected to the filter member, wherein a portion of said exterior surface is not covered by said collection vessel, said collection vessel having an open end which receives a portion of the conduit member, such that the outlet end of the conduit member is in fluid communication with said collection vessel;
- wherein said collection vessel is configured to cause air passing into the inlet end of the conduit member to change its flow direction in order to exit the apparatus via the filter member and the particulate solids are either deposited in said area or filtered by said porous filter member.

10. The apparatus of claim 9, further comprising a reinforcing ring disposed between an end portion of the porous filter member and said area of the collection vessel, said reinforcing ring being situated at an end of the filter member opposite the transverse collar of the conduit member.

11. The apparatus of claim 9, wherein the collection vessel has a removable end cap to allow the particulate solids deposited therein to be emptied.

12. The apparatus of claim 9, wherein the filter member comprises a foraminous outer screen surrounding said exterior surface of the filter element.

13. The apparatus of clam 9, wherein said exterior surface of said perforated filter member is directly exposed to ambient air.

14. A method of filtering clutch dust, comprising:
- transferring a fluid mixture through a conduit, said fluid mixture comprising air and clutch dust;
- receiving said fluid mixture in an area defined by a collection vessel, said area being in fluid communication with said conduit;
- passing said fluid mixture through a filler media having an inner surface and an outer surface, said inner surface being in a faced spaced relationship with an exterior of said conduit and said inner surface is in fluid communication with said area, said outer surface being in fluid communication with ambient air, wherein said collection vessel is configured to cause said fluid mixture to change its flow direction in order to pass said fluid mixture through said filter media,
- wherein the clutch dust is either deposited in said area or is filtered by said filter media.

15. The method of claim 14, further comprising:
- providing a removable end cap for erupting the contents of said area.

16. The method of claim 14, wherein said outer surface is directly exposed to ambient air.

17. The method of claim 16, wherein said outer surface is covered by a screen.

* * * * *